(12) United States Patent
Ajiki

(10) Patent No.: US 7,976,975 B2
(45) Date of Patent: Jul. 12, 2011

(54) BATTERY DEVICE AND ELECTRONIC APPARATUS

(75) Inventor: Yoshiharu Ajiki, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 990 days.

(21) Appl. No.: 11/842,548

(22) Filed: Aug. 21, 2007

(65) Prior Publication Data

US 2008/0057355 A1   Mar. 6, 2008

(30) Foreign Application Priority Data

Sep. 5, 2006 (JP) ................................. 2006-240854

(51) Int. Cl.
  *H01M 10/44* (2006.01)
  *H01M 6/30* (2006.01)
  *H01M 6/32* (2006.01)
  *H01M 6/00* (2006.01)
  *H01M 10/00* (2006.01)
(52) U.S. Cl. ......... 429/111; 320/101; 429/118; 429/122
(58) Field of Classification Search .................. 320/101; 429/111, 188, 122
  See application file for complete search history.

(56) References Cited

U.S. PATENT DOCUMENTS

| | | | | |
|---|---|---|---|---|
| 4,481,265 | A * | 11/1984 | Ezawa et al. | 429/9 |
| 4,965,151 | A * | 10/1990 | Takada et al. | 429/219 |
| 5,190,695 | A | 3/1993 | Sotomura | |
| 5,437,692 | A * | 8/1995 | Dasgupta et al. | 29/623.1 |
| 7,321,037 | B2 * | 1/2008 | Wu et al. | 546/10 |

FOREIGN PATENT DOCUMENTS

| | | |
|---|---|---|
| JP | A-02-044660 | 2/1990 |
| JP | A-03-016921 | 1/1991 |
| JP | A-03-297005 | 12/1991 |
| JP | A-04-033263 | 2/1992 |
| JP | A-05-166552 | 7/1993 |
| JP | A-06-077513 | 3/1994 |
| JP | A-08-330616 | 12/1996 |
| JP | A-09-245848 | 9/1997 |
| JP | A-11-074002 | 3/1999 |
| JP | A-2002-042863 | 2/2002 |
| JP | A-2003-115327 | 4/2003 |
| JP | A-2004-288985 | 10/2004 |
| JP | A-2005-116324 | 4/2005 |
| JP | A-2006-172758 | 6/2006 |

OTHER PUBLICATIONS

Teshima et al., "Properties of Three Electrode PhotoCapacitor and its Improvement (II)," Abstracts of the 2005 Fall Meeting of the Electrochemical Society of Japan, (2005 nen denki kagaku gakkai shuki taikai yokohsyu) IE20, p. 93.

* cited by examiner

*Primary Examiner* — Patrick Ryan
*Assistant Examiner* — Julian Mercado
(74) *Attorney, Agent, or Firm* — Oliff & Berridge PLC

(57) ABSTRACT

A battery device includes a photoelectric conversion device and a secondary battery. The photoelectric conversion device includes a first positive electrode, a first negative electrode, and a photoelectric conversion layer provided between the first positive electrode and the first negative electrode, the photoelectric conversion layer including an inorganic semiconductor and a pigment. The secondary battery includes a second positive electrode, a second negative electrode, and an electrolyte layer provided between the second positive electrode and the second negative electrode. Here, one of a first electrode pair and a second electrode pair is adhered directly, the first electrode pair including the first and the second positive electrodes, and the second electrode pair including the first and the second negative electrodes.

17 Claims, 6 Drawing Sheets

BATTERY DEVICE AND ELECTRONIC APPARATUS

BACKGROUND

1. Technical Field

The present invention relates to a battery device, particularly to the one including a photoelectric conversion device and a secondary battery combined therein, as well as to an apparatus including such battery device.

2. Related Art

In order to construct a solar cell (photoelectric converter) system, a secondary battery is necessary for accumulating the electricity generated by the solar cell.

The problem inherent in using the secondary batteries is that the secondary batteries are arranged separately from the solar cell in a different place, thereby requiring securing a designated space for them, making the system less mobile.

An example of a structure that resolves such problem is disclosed in JP-A-8-330616. In this example, the secondary battery and an amorphous silicon solar cell are combined and coupled in parallel.

However, such solar cell system includes the following problems. The number of the secondary batteries as well as the number of the solar cells (i.e., the number of cell rows) needs to be adjusted in a way that the output voltage of the entire system can be configured to a required value. Secondly, the manufacturing cost increases, since the build-in potential of the P-N junction needs to be adjusted by techniques such as impurity doping in silicon, in order to adjust the open circuit voltage (Voc) of the amorphous silicon solar battery.

Moreover, a device is disclosed in "Tejima et al, 'Abstracts of the 2005 Fall Meeting of the Electrochemical Society of Japan' (2005 nen denki kagaku gakkai shuki tailkai yokohsyu) 1E20, page 93", the device in which a dye-sensitized solar cell and an electric double layer capacitor are adhered.

However, the device recited above is difficult to design, and is deficient in commercial viability, since the discharge capacity is 0.05 mAh/cm$^2$ (extremely small) if the final voltage is 0.3V, and the since the discharge characteristics does not exhibit any range where the voltage value becomes flat.

SUMMARY

An advantage of the invention is to provide a battery device with a simple structure that exhibits fine characteristics, the battery device having a photoelectric conversion device and a secondary battery combined therein, as well as to provide an apparatus provided with such battery device.

Such advantage is achieved by the following aspects of the invention.

According to a first aspect of the invention, a battery device includes a photoelectric conversion device and a secondary battery. The photoelectric conversion device includes a first positive electrode, a first negative electrode, and a photoelectric conversion layer provided between the first positive electrode and the first negative electrode, the photoelectric conversion layer including an inorganic semiconductor and a pigment. The secondary battery includes a second positive electrode, a second negative electrode, and an electrolyte layer provided between the second positive electrode and the second negative electrode. Here, one of a first electrode pair and a second electrode pair is adhered directly, the first electrode pair including the first and the second positive electrodes, and the second electrode pair including the first and the second negative electrodes.

Consequently, a battery device with an simple configuration and a fine characteristic is obtained, the battery device including a photoelectric conversion device and a secondary battery combined therein.

According to a second aspect of the invention, a battery device includes a photoelectric conversion device and a secondary battery. The photoelectric conversion device includes a first positive electrode, a first negative electrode, and a photoelectric conversion layer provided between the first positive electrode and the first negative electrode, the photoelectric conversion layer including an inorganic semiconductor and a pigment. The secondary battery includes a second positive electrode, a second negative electrode, and an electrolyte layer provided between the second positive electrode and the second negative electrode. Here, one of a first electrode pair and a second electrode pair being adhered having a conductive intermediate layer therebetween, the first electrode pair including the first and the second positive electrodes, and the second electrode pair including the first and the second negative electrodes.

Consequently, a battery device with an simple configuration and a fine characteristic is obtained, the battery device including a photoelectric conversion device and a secondary battery combined therein.

It is desirable that, in the battery device according to the above aspects of the invention, the intermediate layer be a laminate including a plurality of deposited layers.

This allows an intermediate layer to exhibit a plurality of functions.

It is desirable that, in the battery device according to the above aspects of the invention, the intermediate layer include a resistor layer having a functionality to adjust the amount of electricity generated by the photoelectric conversion device in order for the electricity to be supplied to the secondary battery.

This prevents or suppresses a rapid supply of electricity generated by the solar cell to the secondary battery, thereby contributing to a longer lifetime of the secondary battery and of the battery device.

It is desirable that, in the battery device according to the above aspects of the invention, the intermediate layer include a light reflecting layer having a functionality to reflect a light passing through the photoelectric conversion device back to the photoelectric conversion layer.

Consequently, the photoelectric conversion layer receives again an incident light that has passed through the solar cell, thereby improving the efficiency in electric generation.

According to a third aspect of the invention, a battery device includes a photoelectric conversion device and a secondary battery. The photoelectric conversion device includes a first positive electrode, a first negative electrode, and a photoelectric conversion layer provided between the first positive electrode and the first negative electrode, the photoelectric conversion layer including an inorganic semiconductor and a pigment. The secondary battery includes a second positive electrode, a second negative electrode, and an electrolyte layer provided between the second positive electrode and the second negative electrode. Here, one of a first electrode pair and a second electrode pair forms a common electrode, the first electrode pair including the first and the second positive electrodes, and the second electrode pair including the first and the second negative electrodes.

This allows making the battery device smaller and thinner, while simplifying a manufacturing process, thereby reducing the manufacturing cost.

It is desirable that, in the battery device according to the above aspects of the invention, the common electrode have a functionality of a light reflecting layer.

Consequently, the light that has passed through the solar cell is reflected by a light reflecting layer, so that the photoelectric conversion layer receives an incident light again, thereby improving the efficiency in electric generation.

It is desirable that, in the battery device according to the above aspects of the invention, an output voltage of the photoelectric conversion device and a withstand voltage of the second battery be approximately the same.

Consequently, deterioration or damage of the secondary battery may suitably be prevented.

It is desirable that an average thickness of the battery device according to the above aspects of the invention be 100 to 700 μm.

This allows making the battery device smaller and thinner, thereby expanding the scope of application of the battery device.

It is desirable that, in the battery device according to the above aspects of the invention, an output voltage of the photoelectric conversion device be 0.55V or less.

Hence, an appropriate charge voltage is obtained.

It is desirable that, in the battery device according to the above aspects of the invention, the output voltage of the photoelectric conversion device be adjusted in accordance with at least one of a presence and a size of a region in which the pigment is not applied on the inorganic semiconductor layer when viewed from the top.

In such photoelectric conversion device, unlike the case of the amorphous silicon solar cell, the output voltage (open circuit voltage) can be adjusted with ease without using techniques such as impurity doping.

It is desirable that, in the battery device according to the above aspects of the invention, at least one of the second positive electrode and the second negative electrode of the secondary battery be composed with an electrode material containing silver vanadate.

Using δ type silver vanadate improves the performance of an electrode layer and the charge-discharge characteristics of the secondary battery. Moreover, since δ silver vanadate is stable in the atmosphere, the handling thereof is easy. This property allows forming the electrode layer with a liquid-phase process.

It is desirable that, in the battery device according to the above aspects of the invention, the electrolyte layer of the secondary battery be composed with an electrolyte material containing silver iodide tungstate.

Using silver iodide tungstate improves the performance of an electrolyte layer and the charge-discharge characteristics of the secondary battery. Moreover, since silver iodide tungstate is stable in the atmosphere, the handling thereof is easy. This property allows forming the electrolyte layer with a liquid-phase process.

It is desirable that, in the battery device according to the above aspects of the invention, the second positive electrode be formed with a laminate, one layer therewithin having a current collector layer at a side farther from the electrolyte layer.

Consequently, the current density within the second positive electrode becomes even during the charge and the discharge of the secondary battery. This suitably prevents the alteration and deterioration of the electrolyte layer caused by the local flow of current in part of the electrolyte layer, thereby improving the charge-discharge characteristics of the secondary battery.

It is desirable that, in the battery device according to the above aspects of the invention, the second negative electrode be formed with a laminate, one layer therewithin having a current collector layer at a side farther from the electrolyte layer.

Consequently, the current density within the second negative electrode becomes even during the charge and the discharge of the secondary battery. This suitably prevents the alteration and deterioration of the electrolyte layer caused by the local flow of current in part of the electrolyte layer, thereby improving the charge-discharge characteristics of the secondary battery.

According to a fourth aspect of the invention, an electronic apparatus includes the battery device recited in the above aspects of the invention.

This provides an electronic apparatus with high performance.

BRIEF DESCRIPTION OF THE DRAWINGS

The invention will be described with reference to the accompanying drawings, wherein like numbers reference like elements.

DESCRIPTION OF EXEMPLARY EMBODIMENTS

The battery device according to the desirable illustrated embodiments of the present invention will now be described in detail.

First Embodiment

A first embodiment of the battery device according to the one aspect of the invention will be described.

Figure 1:
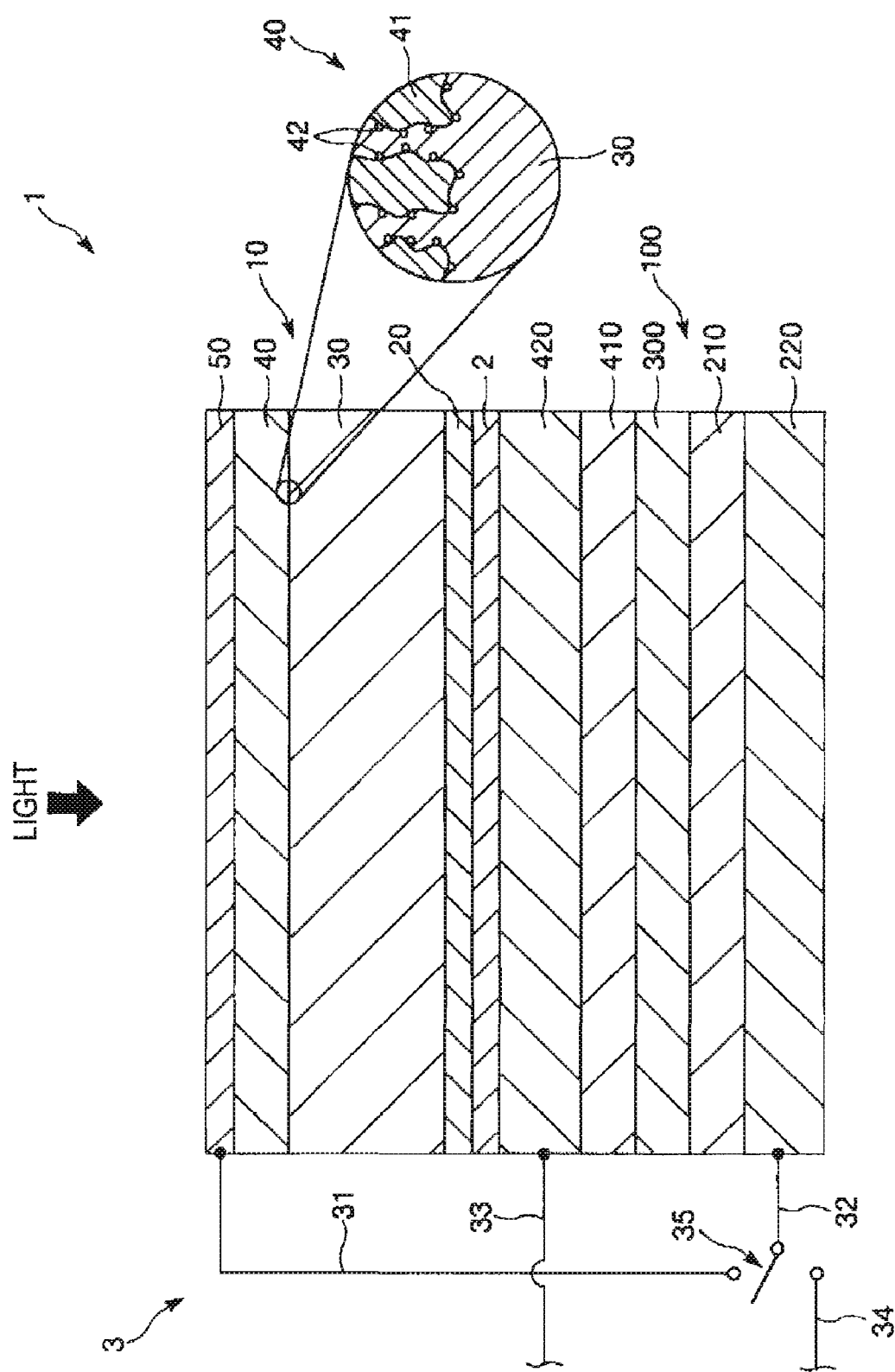
FIG. 1 is a longitudinal sectional view illustrating one embodiment of a battery device according to one aspect of the invention.

FIG. 1 is a longitudinal sectional view illustrating the first embodiment of a battery device according to one aspect of the invention. Hereafter, the topside of FIG. 1 is defined as "top", and the bottom side thereof is defined as "bottom".

A battery device 1 shown in FIG. 1 includes a solar cell (photoelectric conversion device) 10 and a secondary battery (total solid secondary battery) 100, and the positive electrodes thereof are adhered together having an intermediate layer 2 therebetween. In other words, the electrodes with the same polarity are adhered together, having the intermediate layer 2 therebetween Consequently, the battery device 1 can charge the electricity generated by the solar cell 10 to the secondary battery 100. Moreover, the battery device 1 does not require a large space for its installation, which makes the device conveniently mobile.

The structures of each component of the battery device 1 will now be described.

Solar Cell 10

The solar cell 10 functions as a electric generation unit in the embodiments of the invention.

As shown in FIG. 1, the solar cell (dye-sensitized solar cell) 10 includes a layered first positive electrode 20, an electrolyte layer 30, a photoelectric conversion layer 40, and a layered first negative electrode 50, deposited in that order.

As shown in FIG. 1, the solar cell 10 in the first embodiment receives an incident light such as solar light (hereafter simply referred to as a "light") irradiated from the side of the first negative electrode 50. Desirably, the first negative electrode 50 is practically transparent, i.e., clear and colorless, colored and transparent, or translucent. This way, the light effectively reaches the photoelectric conversion layer 40 described in detail later.

The first negative electrode 50 receives an electron generated from a pigment 42 (photoelectric conversion layer 40) described later. One end of a conductor 31 of an external circuit 3 is coupled with the first negative electrode 50 which transports the received electron to the conductor 31.

Examples of constituent materials of the first negative electrode 50 include: metal oxides such as indium tin oxide (ITO), tin oxide containing fluorine atoms (FTO), indium oxide (IO), and tin oxide ($SnO_2$); metal materials such as aluminum, nickel, cobalt, platinum, silver, gold, copper, molybdenum, titanium, tantalum, and alloys containing them; and carbon material such as graphite. These materials may be used alone or in combination of two or more (for instance, a laminate including a plurality of layers).

The first positive electrode 20 is provided facing the first negative electrode 50. The first positive electrode 20 receives a hole generated from the pigment 42 (photoelectric conversion layer 40), and transports the hole to the secondary battery 100 through the intermediate layer 2.

Examples of constituent materials of the first positive electrode 20 include: metal oxides such as indium tin oxide (ITO), tin oxide containing fluorine atoms (FTO), indium oxide (IO), and tin oxide ($SnO_2$); metal materials such as aluminum, nickel, cobalt, palladium, platinum, silver, gold, copper, molybdenum, titanium, tantalum, and alloys containing them; and various carbon materials such as graphite. These materials may be used alone or in combination of two or more.

Among the above materials, it is particularly preferable to use: metals such as nickel, cobalt, palladium, platinum, copper, gold, and alloys containing them; carbons such as nano-carbon; a mixture thereof that is catalytically active; and a compound material containing the described materials and other materials. Here, the first positive electrode 20 is catalytically active and thus the redox ion $I^{3-}$— is easily reduced to I—. Thereby the generation efficiency (photoelectric conversion efficiency) of the solar cell 10 is improved.

If the first positive electrode 20 is formed with a compound material, examples of other materials for mixing includes organic conductive materials such as PEDOT/PSS.

The average thicknesses of the first positive electrode 20 and the first negative electrode 50 are optionally set depending on their constituent materials and the application of the battery device 1, and no specific limitation is imposed thereto. Examples of the thicknesses are as follows.

In case the metal oxide materials (transparent conductive material) are used for forming the first positive electrode 20 and the first negative electrode 50, the average thicknesses thereof may preferably be approximately 0.05 to 5 μm and 0.1 to 1.5 μm respectively. In case the metal materials or the carbon materials are used for forming the first positive electrode 20 and the first negative electrode 50, the average thicknesses thereof may preferably be approximately 0.01 to 1 μm and 0.03 to 0.1 μm respectively.

The photoelectric conversion layer 40 is provided between the first positive electrode 20 and the first negative electrode 50, the photoelectric conversion layer 40 being in contact with the first negative electrode 50.

The photoelectric conversion layer 40 includes an inorganic semiconductor layer 41 and the pigment 42 deposited (loaded) on the inorganic semiconductor layer 41, and electrons and holes are generated, caused by the receiving of light, in the region including at least the pigment 42.

The constituent materials of the inorganic semiconductor layer 41 include various inorganic n-type semiconductor materials that are used alone or in combination of two or more. Examples of those n-type semiconductor materials include: titanium oxides such as titanium dioxide ($TiO_2$), zinc oxide (ZnO), tin oxide ($SnO_2$), cadmium sulfide (CdS), and cadmium selenium (CdSe). These materials may be used alone or in combination of two or more.

Moreover, the inorganic semiconductor layer 41 may be porous or dense. As shown in FIG. 1, at least the side that is in contact with the electrolyte layer 30 may preferably be porous. This increases the loading of the pigment 42 and the area thereof that is in contact with the electrolyte layer 30, thereby improving the generation efficiency of the solar cell 10.

The preferable range of the porosity of the inorganic semiconductor layer 41 is, but not limited to, approximately 15 to 50%. Particularly, a range approximately from 20 to 40% is preferable. By setting the porosity of the inorganic semiconductor layer 41 to the above range, the quantity of the pigment 42 deposited to the inorganic semiconductor layer 41 can be increased sufficiently, thereby improving the generation efficiency of the solar cell 10.

The preferable range of the average thickness of the inorganic semiconductor layer 41 (photoelectric conversion layer 40) is, but not limited to, approximately 0.1 to 300 μm, in particular, a range approximately from 0.5 mm to 100 μm. More specifically, a range approximately 1 to 25 μm is preferable.

The pigment 42 is deposited on the surface of the inorganic semiconductor layer 41 as well as on the internal surface of the pore by mechanisms such as absorption and bonding (covalent, coordinative). The pigment 42 generates electrons and holes by receiving light.

Colorants and dyes can be used alone or in combination of two or more as the pigment 42. Colorants are preferable due to less alteration and deterioration over time, and dyes are preferable due to their good absorptive property on the inorganic semiconductor layer 41 (affinity with the inorganic semiconductor material).

Examples of colorants include organic colorants and inorganic colorants. Examples of the organic colorants include: phthalocyanines such as phthalocyanine green; azos such as first yellow; anthraquinones such as anthrapyrimidine yellow; azomethines such as copper azomethine yellow; quinophthalons such as quinophthalon yellow; isoindolines such as isoindolilne yellow; nitrosos such as nickel dioxime yellow; perynones such as perynone orange; quinacridones such as quinacridone magenta; perylenes such as perylene orange; pyrrolopyrroles such as diketopyrrolopyrrole red; and dioxadins such as dioxadin violet. Examples of the inorganic colorants include: carbon colorants such as carbon black; crocoites such as lead chromate; cadmiums such as cadmium yellow; oxide colorants such as copper chromium manganese black; hydroxide colorants such as viridian; ferrocyanides such as iron blue; silicates such as ultramarine blue; phosphates such as mineral violet; and other inorganic colorants such as cadmium sulfide and cadmium selenide. These can be used alone or in combination of two or more.

Examples of dyes include: metal complex dyes such as $RuL_2(SCN)_2$, $RuL_2Cl_2$, $RuL_2CN_2$, Ruthenium 535-bisTBA (manufactured by Solaronics, Inc.), $[RuL_2(NCS_2)]H_2O$(N3 pigments); cyan dye; xanthene dye; azo dye; hibiscus color; black berry color; raspberry color; pomegranate juice color; and chlorophyll. These can be used alone or in combination of two or more. Note that, "L" in the chemical formula described above indicates 2,2'-bipyridine or the derivatives thereof.

The photoelectric conversion layer 40 described above may have, when viewed from the top, the pigment 49 deposited on the entire inorganic semiconductor layer 41, or may also partially include regions to which the pigment 42 is not deposited. The magnitude of the output voltage (open circuit voltage) is adjusted, by adjusting the presence or the size of the regions to which the pigment 42 is not deposited on the inorganic semiconductor layer 41, when the photoelectric conversion layer 40 is viewed from top.

Therefore, unlike the case of the amorphous silicon solar cell, the output voltage of the above solar cell 10 is adjusted with ease without using techniques such as impurity doping for output voltage adjustment.

Any method can be used for depositing the pigment 42 to the inorganic semiconductor layer 41. Preferably, a droplet ejection method (inkjet method) may be used. The droplet ejection method provides a high degree of precision in adjusting the quantity of the pigment 42 deposited on the inorganic semiconductor layer 41, as well as in adjusting the region size on which the pigment 42 is deposited. Therefore, the output voltage of the acceleration sensor 10 is reliably adjusted to the target value with ease.

The preferable pigment content per unit volume (1 $cm^3$) is approximately 0.1 to 10 mmol/$cm^3$ for the inorganic semiconductor layer 41 in the region where the pigment 42 is deposited. Particularly, a range approximately 1 to 2 mmol/$cm^3$ is preferable.

The electrolyte layer (hole transport layer) 30 is provided, being in contact with both the photoelectric conversion layer 40 and the first positive electrode 20. This electrolyte layer 30 has a function to transport the hole generated by the photoelectric conversion layer 40 to the first positive electrode 20.

As shown in FIG. 1, if the photoelectric conversion layer 40 is porous, it is desirable that the electrolyte layer 30, which is a stratiform layer as a whole, partly enters into the pores of the photoelectric conversion layer 40 (inorganic semiconductor layer 41) in a thickness direction. This structure increases the contact area between the photoelectric conversion layer 40 and the electrolyte layer 30, thereby allowing the electrolyte layer 30 to efficiently receive the holes generated by the photoelectric conversion layer 40. As a result, the generation efficiency of the solar cell 10 is improved.

Such electrolyte layer 30 may be in the any following state of solid, liquid, and gel.

Examples of constituent materials of solid electrolyte layer 30 include: organic polymers such as polyarylamine, fluorene-arylamine copolymer, fluorene-bithiophene copolymer, poly(N-vinylcarbazole), polyvinylpyrene, polyvinylanthracene, polythiophene, polyalkyltliophene, polyhexylthiophene, poly(p-phenylenevinylene), polythienylenevinylene, pyrene formaldehyde resin, ethylcarbazole formaldehyde resin, and their derivatives; macromolecules such as dendrimer which include thiophene as a skeleton; small organic molecules such as naphthalene, anthracene, tetracene, pentacene, hexacene, phthalocyanine, perylene, hydrazone, triphenylmethane, diphenylmethane, stilbene, aryl vinyl, pyrazoline, triphenylamine, triarylamine, oligothiophene, and the derivatives thereof; and inorganic materials such as CuI, AgI, AgBr, and CuSCN. These materials may be used alone or in combination of two or more.

The organic polymers recited above may also be used as a mixture mixed with other polymers. An example of a mixture containing polythiophene includes poly(3,4-ethylenedioxythiophene/styrenesulfonate) (PEDOT/PSS).

Examples of the constituent materials of the liquid electrolyte layer 30 include single or combination of two or more redox electrolytes (reduction-oxidation substance/electrolyte constituent), such as halogens and quinines/hydroquinones, e.g., $I/I_3$, $Br/Br_3$, $Cl/Cl_3$, and $F/F_3$. These materials are dissolved into solvents such as water, acetonitrile, ethylene carbonate, propylene carbonate, polyethylene glycol, and a mixture thereof so as to constitute electrolyte solutions.

The preferable electrolyte solution includes, in particular, iodine ($I/I_3$) solution. Specifically, examples of the electrolyte solution include: a resultant of which iodine and potassium iodide are dissolved into ethylene glycol; a resultant of which dimethylhexylimidazolium, iodine, and lithium iodide are dissolved into acetonitrile to which a predetermined amount of tertiary-butylpyridine is added; IodolyteTG50 (manufactured by Solaronics, Inc.); Iodolyte AN-50 (manufactured by Solaronics, Inc.); and 1,2-dimethyl-3-propylimidazolium iodide.

The preferable range of concentration (content) of the electrolyte constituent within the electrolyte solution is, but not limited to, approximately 0.1 to 25 wt %. Particularly, a range approximately from 0.5 to 15 wt % is preferable.

Moreover, the electrolyte layer 30 may be formed in a gel state, for instance, with a gel base in which the electrolyte solution described above is contained.

Examples of such gel base include members composed mainly with: thermoplastic resin, thermosetting resin, copolymers, and compounds containing a siloxane bond. These members may also optionally be used in combination of two or more.

Examples of thermoplastic resin include: polyethylene oxide (PEO), polyacrylonitrile (PAN), polyinylidene difluoride (PVDF), and polymethyl methacrylate (PMMA). They may be used alone or in combination of two or more. Examples of thermosetting resin include: polyamide (PI), epoxy, carbolic, and urea.

The copolymers are obtained by polymerizing at least two compounds (precursors of copolymers) with type of polymerization such as ionic (cation, anion), radical, and a combination thereof. Examples of such copolymers include: epoxies, vinyl ethers, oxetane, urethane acrylates, epoxy acrylates, ester acrylates, and acrylates.

Examples of the above compounds (precursors of copolymers) include: urethane, polyacene, polyacetylene, polyethylene, polycarbonate, polypyrrole, polyaniline, and active sulfur. Two or more of them may be optionally selected for use.

Examples of compounds containing siloxane bond include: polysiloxane, polydimethylsiloxane, polyalkylphenylsiloxane, and polymetallosiloxane in which a part of the silicon atom is substituted with other metallic atoms such as aluminum and titanium.

If the electrolyte layer 30 is in a liquid or a gel state, it is preferable, for instance, to provide a bank (sealing unit)

between and periphery of the first positive electrode 20 and the first negative electrode 50, in order to prevent the electrolyte layer 30 from leaking out to the exterior. At this time, it is preferable that the bank also function as a spacer that defines the distance between the first positive electrode 20 and the first negative electrode 50.

The preferable range of the average thickness of the electrolyte layer 30 (excluding the parts that enter into the pores) is, but not limited to, approximately 1 to 500 µm, in particular, a range approximately from 10 to 300 µm. More specifically, a range approximately 10 to 100 µm is preferable.

The output voltage (open circuit voltage) of the solar cell 10 is preferably 0.55V or less. Consequently, an appropriate charge voltage is obtained for, for instance, the total solid Ag secondary battery.

The magnitude of the output voltage can easily be adjusted, as described, by adjusting the presence or the size of the regions on which the pigment 42 is not deposited on the inorganic semiconductor layer 41, when the photoelectric conversion layer 40 is viewed from top.

Secondary Battery 100

The secondary battery 100 functions as a charging unit in the embodiments of the invention.

As shown in FIG. 1, the secondary battery 100 includes a current collector layer 220, a layered second negative electrode 210, an electrolyte layer 300, a layered second positive electrode 410, and a current collector layer 420, deposited in that order.

One end of a conductor 32 of the external circuit 3 is coupled with the current collector layer 220, and one end of a conductor 33 of the external circuit 3 is coupled with the current collector layer 420.

The other end of the conductor 33 is coupled with a terminal of un-illustrated external apparatus to which the electricity stored in the battery device 1 (the secondary battery 100) is supplied. Another terminal of the external apparatus is coupled with a conductor 34 of the external circuit 3. Moreover, the external circuit 3 includes a switch 35 that switches from the connection between the conductor 31 and the conductor 32, to the connection between the conductor 32 and the conductor 34, and vise versa.

During the charging, the current collector layer 220 and the current collector layer 420 collect (store) the electricity supplied from the solar cell 10, and respectively supply the electricity to the second negative electrode 210 and the second positive electrode 410. During the discharging, they let the external circuit 3 to efficiently retrieve the electricity.

By installing the current collector layer 220 and the current collector layer 420, the current density within the second negative electrode 210 and the second positive electrode 410 becomes even during the charge and the discharge of the secondary battery. This suitably prevents the alteration and deterioration of the electrolyte layer 300 caused by the local flow of current in part of the electrolyte layer 300, thereby improving the charge-discharge characteristics of the secondary battery 100.

Highly conductive materials are suitable for the constituent materials of the current collector layers 220 and 420. Examples thereof include: aluminum, copper, silver, nickel, chromium, lithium and alloys containing them. These materials may be used alone or in combination of two or more (for instance, a laminate including a plurality of layers).

The preferable range of the average thickness of such current collector layers 220 and 420 is approximately 10 to 100 µm. Particularly, a range approximately from 10 to 75 µm is preferable.

In the first embodiment, a laminate is formed including the second negative electrode 210 and the current collector layer 220 that is deposited on the side away from the electrolyte layer 300. Another laminate is formed including the second positive electrode 410 and the current collector layer 420 that is deposited on the side away from the electrolyte layer 300. It can be apprehended that these laminates respectively exhibit a function as a positive electrode and a negative electrode.

The second negative electrode 210 receives electrons supplied from the current collector layer 220, and the second positive electrode 410 receives holes supplied from the current collector layer 420.

Examples of the constituent materials of these second negative electrode 210 and the second positive electrode 410 include the ones formed with an electrode active substance alone, as well as a mixture of an electrode active substance and a solid electrolyte material.

The adhesion is improved between the second negative electrode 210 and the electrolyte layer 300 as well as between the second positive electrode 410 and the electrolyte layer 300, by forming the second negative electrode 210 and the second positive electrode 410 with a mixture of electrode active substance and a solid electrolyte material. As a result, the ion exchange becomes smoother between the second negative electrode 210 and the electrolyte layer 300 as well as between the second positive electrode 410 and the electrolyte layer 300, thereby improving the charge-discharge characteristics of the secondary battery 100.

The secondary battery 100 may preferably be a silver-ion secondary battery. Examples of the electrode active substance include $\delta$ silver vanadate ($\delta$-$Ag_{0.7}V_2O_5$), metallic silver (Ag), and silver chromate ($Ag_2Cr_2O_4$). These materials may be used alone or in combination of two or more. A suitable electrode active substance is $\delta$ silver vanadate, in particular, $\delta$-$Ag_{0.7}V_2O_5$. Using this compound improves the performance of the second negative electrode 210 and the second positive electrode 410, as well as the charge-discharge characteristics of the secondary battery 100. Moreover, since $\delta$ silver vanadate is stable in the atmosphere, the handling thereof is easy. This property allows the forming of the second negative electrode 210 and the second positive electrode 410 with a liquid-phase process, in a later-described manufacturing method of the battery device 1.

The withstand voltage of such silver-ion secondary battery is approximately 0.55V. Therefore, by setting the output voltage (open circuit voltage) of the solar cell 10 to 0.55V or less, as described, the silver-ion secondary battery is charged without installing a protection circuit between the secondary battery 100 and the solar cell 10.

In case the secondary battery 100 is not formed to be the silver-ion secondary battery, a circuitry such as a protection circuit may be installed between the secondary battery 100 and the solar cell 10, depending on the types of the electrode active substance and of the solid electrolyte material composing the secondary battery 100. For example, in case where the secondary battery 100 is formed to be a lithium-ion secondary battery overcharging the battery promotes electrolyzation of electrolytes and may cause inconveniences such as ignitions. In order to prevent such inconveniences, overcharge protection circuit may be installed between the secondary battery 100 and the solar cell 10. Moreover, the lithium-ion secondary battery is charged with a voltage of approximately 3.7V. Therefore, the charging may be carried out by the solar cell 10 that has the output voltage suitable for this charging voltage.

The preferable range of the average thickness of the second negative electrode 210 and the second positive electrode 410 is approximately 10 to 100 μm. Particularly, a range approximately from 10 to 20 μm is preferable.

In the case where the solid electrolyte material is included in the electrode active substance, the same kind of (identical) material is preferably used in particular for the constituent material of the electrolyte layer 300 (electrolyte material), while the material may also be different. As a result, the adhesion is improved, between the second negative electrode 210 and the electrolyte layer 300, as well as between the second positive electrode 410 and the electrolyte layer 300.

The preferable range of mixing ratio of the electrode active substance (conductive material) and the solid electrolyte material is, but not limited to, approximately 2:8 to 8:2 by weight. Particularly, a range approximately from 3:7 to 7:3 is preferable.

Powdered or granular constituent material (electrode material) is suitably used for the second negative electrode 210 and the second positive electrode 410. When forming the second negative electrode 210 and the second positive electrode 410 with a liquid phase process, utilizing the granular electrode material improves the dispersibility (homogenous dispersion) within a material (electrode forming material) for forming the second negative electrode 210 and the second positive electrode 410. Thereby an even thickness and homogeneity are obtained for second negative electrode 210 and the second positive electrode 410.

The electrolyte layer 300 is disposed between the second negative electrode 210 and the second positive electrode 410, both being in contact with the electrolyte layer 300. Ions (metallic ions) move within this electrolyte layer 300, during the charge and discharge of the secondary battery 100.

The electrolyte layer 300 is preferably formed with electrolyte particles (solid electrolyte particles). This facilitates ions to move smoothly along the interfaces (grain boundaries) between the electrolyte particles, thereby improving the efficiency of charging and discharging of the secondary battery 100.

Such electrolyte particles are preferably formed with ionic conductor or a mixture including the ionic conductor (ionic conductive mixture).

In case where the secondary battery 100 is formed to be a silver-ion secondary battery, examples of the ionic conductor (silver-ion conductor) include: silver tungstate iodide ($Ag_6I_4WO_4$), AgI, $Ag_4RbI_5$, $Ag_3SI$, and $Ag_2S$. These materials may be used alone or in combination of two or more. Silver tungstate iodide in particular, $Ag_6I_4WO_4$) is suitable for the silver-ion conductor. Using this compound improves the performance of the electrolyte layer 300 and the charge-discharge characteristics of the secondary battery 100. Moreover, since silver iodide tungstate is stable in the atmosphere, the handling thereof is easy. This property allows forming the electrolyte layer 300 with a liquid-phase process.

Preferably, such ionic conductor includes at least one of crystalloid and amorphous conductors. Crystalloid ionic conductors increase the capacity of ions drawn into the crystalloid structure. In other words, compared to an amorphous state, the capacity is larger since the volume of ion transport is larger. Amorphous ionic conductors are thermally stable, and therefore provide a high tolerance level during manufacturing and a usage of the secondary battery 100. Preparation of fine particles of amorphous ionic conductors is easy, which makes the preparation of the secondary battery 100 simple, when using printing methods such as inkjet method. Consequently, using a mixture of crystalloid and amorphous ionic conductors may increase the capacity while simplifying the manufacturing process.

The preferable range of the average grain size of such electrolyte grains is, but not limited to, approximately 0.1 to 10 μm. Particularly, a range approximately from 0.1 to 1.0 μm is preferable. Using such electrolyte grains of such sizes increases the area where those electrolyte grains are in contact with each other, which sufficiently secures a transport route of ions (metallic ions), thereby improving the characteristics of the secondary battery 100.

The preferable range of the average thickness of the electrolyte layer 300 is, but not limited to, approximately 1 to 100 μm. Particularly, a range approximately from 10 to 20 μm is preferable.

At least one layer with optional purpose may also be disposed between the electrolyte layer 300 and the second negative electrode 210, as well as between the electrolyte layer 300 and the second positive electrode 410.

It is preferable that the output voltage of the solar cell 10 and the withstand voltage of the secondary battery 100 be approximately the same. With this structure, preventing the deterioration or damage of the secondary battery 100 is ensured, without installing circuitries such as a protection circuit between the solar cell 10 and the secondary battery 100. According to the embodiments of the present invention, the output voltage of the solar cell 10 can be set, as described above, by adjusting the volume of the pigment 42 deposited on the inorganic semiconductor layer 41. Therefore, it is relatively easy to set the output voltage of the solar cell 10 and the withstand voltage of the secondary battery 100 to be approximately equal.

Positive electrodes of such solar cell 10 and secondary battery 100 are adhered together having the conductive intermediate layer 2 therebetween.

The intermediate layer 2 is deposited, so as to serve as a resistor layer, an adhesive layer, and a light reflecting layer. The resistor layer has a functionality to adjust the amount of electricity generated by the solar cell 10 and supplied to the secondary battery 100. The adhesive layer has a functionally to improve the adhesion between the solar cell 10 and the secondary battery 100. The light reflecting layer has a functionality to reflect a light that has passed (transmitted) through the solar cell 10 back to the solar cell 10 (the photoelectric conversion layer 40). The intermediate layer 2 may be any one of the following: a layer that has a single functionality listed above, a single layer that has a number of functionalities listed above, or, a laminate formed by depositing the layers each having each of the above functionalities. Note that if the intermediate layer 2 is formed as a laminate, it is possible to assure the intermediate layer 2 to exhibit the plurality of functionalities described above.

The intermediate layer 2 preferably includes a resistor layer. This prevents or suppresses a rapid supply of electricity generated by the solar cell 10 to the secondary battery 100, so that a relatively stable amount of current flows therebetween over a period of time, thereby contributing to a longer lifetime of the secondary battery 100 as well as of the battery device 1.

Examples of constituent materials of the resistor layer include conductive oxides, such as indium tin oxide (ITO), indium tin oxide containing fluorine (FTO), zinc oxide (ZnO), antimony tin oxide (ATO), indium oxide (IO), tin oxide ($SnO_2$), and indium zinc oxide (IZO).

The preferable range of resistance (sheet resistance) of the resistor layer is, but not limited to, approximately 1 to 1000Ω/□. Particularly, a range approximately from 100 to 500Ω/□ is preferable.

The intermediate layer 2 preferably includes a light reflecting layer. The reflecting layer reflects the light that has passed through the solar cell 10 back to the photoelectric conversion layer 40, so that the photoelectric conversion layer 40 again receives an incident light, thereby improving the efficiency in electric generation of the solar cell 10.

Examples of the constituent materials of the light reflecting layer include Al, Ni, Co, Ag, and alloys containing them.

The preferable light reflectivity of the light reflecting layer is, but not limited to, 60% or more. Particularly, a range approximately from 90 to 99.8% is preferable.

The preferable range of the average thickness of the intermediate layer 2 is, but not limited to, approximately 0.01 to 1 μm. Particularly, a range approximately 0.1 to 0.5 μm is preferable.

Moreover, the preferable range of the average thickness of the battery device 1 as a whole is, but not limited to, approximately 100 to 700 μm, in particular, a range approximately 100 mm to 400 μm. More specifically a range approximately 200 to 300 μm is preferable. This allows making the battery device smaller and thinner, thereby expanding the scope of application of the battery device 1.

In this embodiment, a case is explained where the first positive electrode 20 and the second positive electrode 410 has the same planer dimensions. However, the embodiment is not limited thereto, and the first positive electrode 20 may have a larger planer dimension than that of the second positive electrode 410. With such structure, it is also possible to receive the electricity supplied from the solar cell 10 through the intermediate layer 2, ensuring the charging of the secondary battery 100.

In the above described battery device 1, the photoelectric conversion layer 40 receives an incoming light when the light is irradiated from the side of the first negative electrode 50 of the solar cell 10, and electrons are excited mainly in the pigment 42, generating an electron (e−) and a hole (h+).

The electron moves to the first negative electrode 50, and the hole moves to the first positive electrode 20, generating a potential difference (photoelectric power) between the first positive electrode 20 and the first negative electrode 50.

In this state, if the switch 35 is switched to connect the conductor 31 and the conductor 32, the electricity flows in the external circuit 3.

This electricity is supplied to the secondary battery 100, and the electrode active substance is oxidized in the second positive electrode 410. Thereby the ions are created and reach the second negative electrode 210 though the electrolyte layer 300.

At the same time, a product is formed in the second negative electrode 210 by the reduction reaction between the ion that traveled through the electrolyte layer 300 and the electrode active substance. In this state, the battery device 100 is charged with the electricity generated by the solar cell 10.

After sufficient electricity is stored in the secondary battery 100, if the switch 35 is switched to connect the conductor 32 and the conductor 34, the electricity stored in the secondary battery 100 is supplied to the external apparatus through the conductor 34 connected to the conductor 33 and the conductor 32.

Each constituting layer of such battery device 1 may be manufactured with a liquid-phase process or a vapor-phase process such as vapor deposition and sputtering. However, it is preferable to form as many layers as possible with a liquid-phase process, so as to manufacture the battery device 1. This allows manufacturing of the battery device 1 with a simple method, without requiring extensive equipments such as a vacuum apparatus, thereby reducing the cost. This is realized by optionally selecting the constituting material of the layer formed with a liquid-phase process.

An example of forming as many layers as possible with a liquid-phase process will now be described, typically for the case of creating a silver-ion secondary battery as the secondary battery 100.

(1) A metal film (metal sheet) composed with, for instance, Ni is prepared. The metal film functions as a light reflecting layer.

The metal film being used is obtained by forming the film on a substrate with methods such as electroplating, electroless plating, and dipping, and thereafter delaminating the film from the substrate.

(2) A resistor layer is formed on one side of the metal film (metal layer), and the first positive electrode 20 (catalytic layer) is formed thereon. In this embodiment, this metal film and the resistor layer define the intermediate layer 2.

The metal film may be cleaned prior to the forming of the resistor layer and the first positive electrode 20. Examples of the cleaning methods include: cleaning with a cleaning fluid, oxygen plasma treatment, argon plasma treatment, and ultraviolet-ozone treatment. These cleaning methods may be carried out independently, or, in combination of two or more variations.

The resistor layer is easily formed with methods such as electroless plating. The resistor layer may also be formed on the metal film by, for instance, supplying, with a coating method, the same material as the one which will be explained in the next process (3) of section III where the material for forming the current collector layer (material for forming an intermediate layer) is described, and thereafter carrying out the post treatment as necessary.

The first positive electrode 20 may be formed by, for instance, supplying a material for forming the first positive electrode on the metal film by various kinds of coating, and thereafter carrying out the post treatment as necessary.

Examples of coating methods include: spin coating (pyrosol), casting, microgravure coating, gravure coating, barcode, roll coating, wire barcode, dip coating, spray coating, screen printing, flexo printing, offset printing, and droplet ejection. These methods may be used alone or in combination of two or more.

Examples of post treatments include thermal process and irradiation of rays, such as ultraviolet, electron, and radiation. These rays may be used alone or in combination of two or more.

The same methods listed above may be used for the following process.

The materials for forming the first positive electrode include the same materials listed for forming the first positive electrode 20 above.

Materials for disperse medium may include: various types of water such as distilled water, deionized water, ion-exchanged water, and reverse osmosis water; alcohols such as methanol, ethanol, isopropanol, butanol, octanol, ethylene glycol, diethylene glycol, and glycerin; cellosolves such as methyl cellosolve, ethyl cellosolve, and phenyl cellosolve; esters such as methyl acetate, ethyl acetate, butyl acetate, and ethyl formate; ketones such as acetone, methyl ethyl ketone, diethyl ketone, methyl isobutyl ketone, methyl isopropyl ketone, and cyclohexanone, aliphatic hydrocarbons such as pentane, hexane, and octane; alicyclic hydrocarbons such as cyclohexane, and methylcyclohexane; aromatic hydrocarbons having a long-chain alkyl radical such as benzene homologs, examples thereof including benzene, toluene, xylene, hexylbenzene, heptylbenzene, octylbenzene, nonylbenzene, decylbenzene, undecylbenzene, dodecylbenzene, tridecylbenzene, and tetradecylbenzene; hydrocarbon halides such as methylene chloride, chloroform, carbon tetrachloride, and 1,2-dichloroethane; aromatic heterocycles such as pyridine, pyrazine, furan, pyrrole, thiophene, and methylpyrrolidone; nitrites such as acetonitrile, propionitrile, and acrylonitrile; amides such as N,N-dimethylformamide, N,N-dimethylacetamide; and carboxylate, or other various oils. These materials may be used alone or as a mixture.

A viscosity adjusting agent may be added to the material for forming the first positive electrode for adjusting viscosity.

Examples of viscosity adjusting agents include, but not limited to, polyethylene glycol, monoethanolamine, triethanolamine, glycerol, and propylene glycol. These materials may be used alone or in combination of two or more.

An ultrasonic wave may be applied to the disperse medium for preparing the material for forming the first positive electrode. The dispersion of the constituent materials of the first positive electrode 20 is thereby efficiently dispersed into the dispersion medium.

(3) Thereafter, the current collector layer 420 and the second positive electrode 410 are sequentially formed on the other surface of the metal film (light reflecting film).

The current collector layer 420 may be formed with vapor deposition or electroless plating. An example of other method for forming the current collector layer 420 includes supplying by coating a material for forming the current collector layer on a substrate, and thereafter carrying out the post process as necessary. This allows manufacturing of the current collector layer 420 with a simple method, without requiring extensive equipments such as a vacuum apparatus.

Examples of the materials for forming the current collector layer are enlisted in the following sections I through III.

I: If the current collector layer 420 is composed with various metal oxides, metallic materials, and carbon materials, then the fluids containing the grains composed with those materials may be used as the materials for forming the current collector layer 420.

The preferable range of grain content included in the materials for forming the current collector layer is, but not limited to, approximately 5 to 25 wt %. Particularly, a range approximately from 2 to 15 wt % is preferable.

The preferable range of the average grain size of the grains being used is, but not limited to, approximately 1 to 30 nm. Particularly, a range approximately from 2 to 10 nm is preferable.

Grains covered with an aggregation inhibitor (dispersant) are preferably used in order to prevent the aggregation of grains at room temperature. Examples of the aggregation inhibitor include compounds, containing: nitrogen atoms such as alkylamin; radicals including oxygen atoms such as alkanediol; radicals including sulfur atoms such as alkylthiol and alkandithiol.

Here, a depleting agent which can remove the aggregation inhibitor is added to the material for forming the current collector layer by a prescribed treatment (for instance, heating). Examples of the depleting agent include: linear or branch chain of saturated carboxylic acids containing 1 to 10 carbon atoms, such as formic acid, acetic acid, propionic acid, butanoic acid, hexanoic acid, and octyl acid; unsaturated carboxylic acids such as acrylic acid, methacrylic acid, crotonic acid, cinnamic acid, benzoic acid, and sorbic acid; various carboxylic acids that are diacids, such as oxalic acid, malonic acid, sebacic acid, maleic acid, fumaric acid, and itaconic acid; organic acids in which a carboxyl group of the carboxylic acids is substituted with a phosphate group or a sulfonyl group, such as various phosphoric acids and sulfonic acids; and esters of the organic acids. Other examples include: aromatic anhydrides such as phthalic anhydride, trimellitic anhydride, pyromellitic anhydride, benzophenonetetracarboxylic anhydride, ethylene glycol bis-(anhydro-trimellitate), and glycelol tris(anhydro trimellitate); and cyclic aliphatic anhydrides such as maleic anhydride, succinic anhydride, tetrahydrophthalic anhydride, methyltetrahydrophthalic anhydride, methyl nadic anhydride, alkenyl succinate anhydride, hexahydrophthalic anhydride, methylhexahydrophthalic anhydride, and methylcyclohexane tetracarboxylic anhydride; and aliphatic anhydrides such as polyadipic anhydride, polyazelaic anhydride, and polysebacic anhydride.

Examples of the dispersion medium used in the preparation of the material for forming the current collector layer include: terpineol mineral spirits, xylene, toluene, ethylbenzene, mesitylene, hexane, heptane, octane, decane, dodecane, cyclohexane, cyclooctane, and a mixed fluid containing them.

The material for forming the current collector layer may contain precursors of various thermosetting resins added (mixed) therein. Examples of those resins include phenol, epoxy, unsaturated polyester, vinyl ester, diallyl phthalate, oligomeric ester acrylate, xylene, bismaleimide triazine, furan, urea, polyurethane, melamine, and silicon.

The viscosity of such material for forming the current collector layer is adjusted by optionally setting, for instance, the grain content, a type or composition of the dispersion medium, and the presence or a type of viscosity adjusting agents described above. The viscosity is adjusted to suit the coating method being used.

II: If the current collector layer 420 is composed with the various metallic materials, then the fluids containing a reducing agent and precursors (such as metal complex and metallic salt) of various metallic materials, may be used as the materials for forming the current collector layer.

The preferable range of content of the metallic material precursors included in the materials for forming the current collection layer is, but not limited to, approximately 0.1 to 5 wt %. Particularly, a range approximately from 0.5 to 2 wt % is preferable.

Examples of the reducing agent include glucose, fructose, hydrazine, and formalin.

Examples of solvents (or dispersion medium) used in the preparation of material for forming the current collector layer include: methanol, ethanol, water, ethylene glycol, glycerin, and a mixed fluid containing them.

The viscosity of such material for forming the current collector layer is adjusted by optionally setting, for instance, the content of the metallic material precursor, and a type or composition of the dispersion medium. The viscosity is adjusted to suit the coating method being used.

III: In the case where the current collector layer 420 is composed with various metal oxides, fluids including the precursors thereof may be used as the material for forming the current collector layer.

Examples of the precursors of metal oxides being used include: alkoxides, salts, chlorides, sulfides, and cyanides. These materials may be used alone or in combination of two or more.

Examples of the alkoxides include methoxide, ethoxide, propoxide, isopropoxide, and butoxide.

Examples of the salts include halides, formate, acetate, propionate, oxalate, and nitrate.

The preferable range of precursor concentration (content) of the metal oxides included in the materials for forming the current collector layer is, but not limited to, approximately 0.5 to 25 wt %. Particularly, a range approximately from 2 to 15 wt % is preferable.

Examples of solvents (or dispersion medium) used in the preparation of the material for forming the current collector layer include: water; polyalcohols such as ethylene glycol, glycerin, diethylene glycol, and triethanolamine; monohydric alcohols such as methanol, ethanol, isopropanol, butanol, allyl alcohol, furfuryl alcohol, and ethylene glycol monoacetate; and a mixed fluid containing them.

The viscosity of such material for forming the current collector layer is adjusted by optionally setting, for instance, precursor concentration of the metal oxides, and a type or composition of the solvent. The viscosity is adjusted to suit the coating method being used.

Thereafter, the second positive electrode 410 is formed on the current collector layer 420.

The second positive electrode 410 may be formed with electroless plating or electroplating. An example of other methods includes supplying, with a coating method, the material for forming the electrode on the current collector layer 420, and thereafter carrying out the post process as necessary.

A suitable material for forming the electrode layer in this embodiment is a resultant of which grains of δ silver vanadate, in particular, $\delta\text{-Ag}_{0.7}V_2O_5$ are dispersed into an appropriate dispersion medium. Since δ silver vanadate, in particular, $\delta\text{-Ag}_{0.7}V_2O_5$ is stable in the atmosphere, as well as in the dispersion medium described above, it is easy to handle the electrode forming material, a resultant of which the grains of δ silver vanadate are dispersed into the dispersion medium.

The preferable range of grain content within the material for forming the electrode layer is, but not limited to, approximately 0.5 to 25 wt %. Particularly, a range approximately from 2 to 15 wt % is preferable.

The preferable range of the average grain size of the grains being used is, but not limited to, approximately 0.1 to 10 μm. Particularly, a range approximately from 1 to 5 μm is preferable.

The same dispersion medium described above may be utilized.

The viscosity of such material for forming the electrode layer is adjusted by optionally setting, for instance, grain content, a type or composition of the dispersion medium, and the presence or a type of additives. The viscosity is adjusted to suit the coating method being used.

(4) Thereafter, the electrolyte layer 300 is formed on the second positive electrode 410.

Similar to the forming process of the second positive electrode 410 described above, the electrolyte layer 300 is formed by supplying, with a coating method, the material for forming the electrolyte layer on the second negative electrode 210, and thereafter carrying out the post process as necessary.

In this embodiment, a suitable material for forming the electrolyte layer is a resultant of which the grains of silver tungstate iodide (in particular, $Ag_6I_4WO_4$) are dispersed into an appropriate dispersion medium. Silver tungstate iodide, in particular, $Ag_6I_4WO_4$, is stable in the atmosphere similar to δ silver vanadate, as well as in the dispersion medium described above. It is therefore easy to handle the electrolyte layer forming material, a resultant of which the grains of silver tungstate iodide are dispersed into the dispersion medium.

The same dispersion medium described above may be utilized.

(5) Subsequently, the second negative electrode 210 and the current collector layer 220 are sequentially formed on the electrolyte layer 300. Consequently, the secondary battery 100 is obtained on one side of the intermediate layer 2.

The second negative electrode 210 and the current collector layer 220 are formed in the manners similar to the ones described in step (3) for the second positive electrode 410 and the current collector layer 420.

The current collector layer 420 may be formed by laminating and pressing a metal film (metal sheet) prepared separately to the laminate formed including layers from the bottom to the second negative electrode 210 deposited thereto, so as to adhere it.

The preferable range of the pressing pressure is, but not limited to, approximately 0.1 to 10 $t/cm^2$. Particularly, a range approximately from 1 to 5 $t/cm^2$ is preferable.

Moreover, as described in steps (3) through (5), the secondary battery 100 is formed with a liquid-phase process, by optionally selecting the type of constituent material for each layer of the secondary battery 100. This allows manufacturing of the secondary battery with a simple method, without requiring extensive equipments such as a vacuum apparatus, thereby reducing the cost of the battery device.

(6) At the same time, a conductive film (conductive sheet) is prepared for the first negative electrode 50.

The conductive film which may also be used here is obtained by forming a film on a substrate with methods similar to that of the resistor layer, and thereafter delaminating the film from the substrate.

(7) Thereafter, the photoelectric conversion layer 40 is formed on the first negative electrode 50.

First, the inorganic semiconductor layer 41 is formed on the first negative electrode 50, and the pigment 42 is deposited (adsorbed) on the inorganic semiconductor layer 41.

In this embodiment, the inorganic semiconductor layer 41 is porous. In such case, the inorganic semiconductor layer 41 is formed by, for instance, supplying a material for forming the inorganic semiconductor layer that contains the inorganic semiconductor grains on the first negative electrode 50, by various kinds of coating, and thereafter carrying out the post process as necessary.

The preferable range of the average grain size of the inorganic semiconductor grains is, but not limited to, approximately 1 nm to 1 μm, in particular, a range approximately 1 mm to 10 nm. More specifically, a range approximately 5 to 50 nm is preferable. Thus the inorganic semiconductor grains are homogenously dispersed throughout the material for forming the inorganic semiconductor layer, thereby making it easy to control the state of the pores in the inorganic semiconductor layer 41. Examples of the state of the pores to be controlled include porosity and pore distribution.

The preferable content range of the inorganic semiconductor grains included in the material for forming the inorganic semiconductor layer is, but not limited to, approximately 0.1 to 10 wt %. Particularly, a range approximately from 0.5 to 5 wt % is preferable.

In this embodiment, firing is the preferable post process. A preferable range of the firing condition is, for instance, 250 to 500° C. multiplied by 0.5 to 3 hours.

The inorganic semiconductor layer 41 obtained thereby is porous, including a multiple continuous pores, the adjacent pores being connected continuously. This increases the surface area of the inorganic semiconductor layer 41, thereby increasing the pigment loading of the pigment 42 in the inorganic semiconductor layer 41. As a result, the generation efficiency of the solar cell 10 is increased.

Thereafter, the pigment 42 is deposited to the surface of, as well as to the internal pore surface of the inorganic semiconductor layer 41.

The deposition is suitably carried out by letting a pigment-containing fluid contact the inorganic semiconductor layer 41. A large amount (considerable amount) of pigment 42 is thereby effectively deposited at once to the surface of, as well as to the internal pore surface of the inorganic semiconductor layer 41.

The droplet ejection method is suitably used as a method for letting the pigment fluid contact the inorganic semiconductor layer 41, due to the reasons described above.

Subsequently after supplying the pigment fluid to the inorganic semiconductor layer 41, the dispersion medium is removed by methods such as cold curing, spraying gases (air, nitrogen gas, etc.), lyophilization, and a heat treatment performed relatively at low temperature.

(8) Thereafter, the electrolyte layer 30 is formed. For instance, the electrolyte layer 30 is formed in fluid.

First, an un-illustrated bank is formed along the peripheries of the photoelectric conversion layer 40 and the first positive electrode 20, in a state where the two are facing each other.

A supply mouth for supplying the material for forming the electrolyte layer 30 is formed in the bank.

The bank is formed with, for instance, thermosetting resins described above. The bank may also have a function of a spacer that defines the distance between the photoelectric conversion layer 40 and the first positive electrode 20.

The electrolyte fluid is supplied to the space surrounded by the bank between the photoelectric conversion layer 40 and the first positive electrode 20. Thereafter, the supply mouth is sealed.

Consequently, the solar cell 10 is obtained on the other surface of the intermediate layer 2 with the processes described above, thereby completing the battery device 1.

Finally, the external circuit 3 is connected to the battery device 1.

Such battery device 1 is assembled into various electronic apparatuses.

Second Embodiment

A second embodiment of the battery device according aspects of the invention will now be described.

Figure 2:
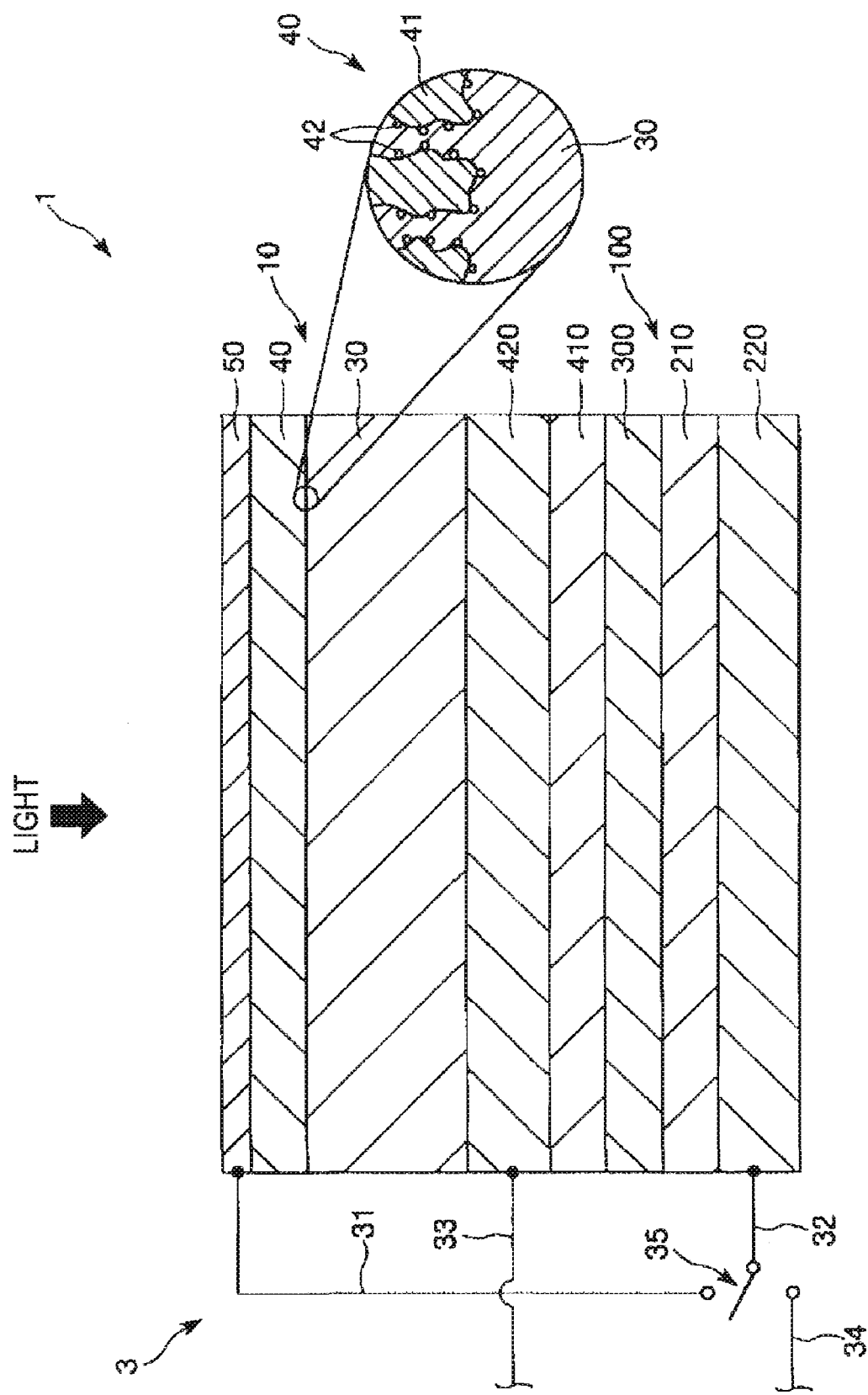
FIG. 2 is a longitudinal sectional view illustrating another embodiment of a battery device according to aspects of the invention.

FIG. 2 is a longitudinal sectional view illustrating the second embodiment of a battery device according to aspects of the invention. Hereafter, the topside of FIG. 2 is defined as "top", and the bottom side thereof is defined as "bottom".

Descriptions of items in the second embodiment that overlap the items in the first embodiment will be omitted in the explanation, and the differences therebetween will mainly be described.

The battery device 1 shown in FIG. 2 is the same as that of the first embodiment, except that the forming of the first positive electrode 20 and the intermediate layer 2 is omitted.

In other words, in the second embodiment, the current collector layer 420 exhibits a functionality of a first positive electrode as well as a partial functionality of the second positive electrode. This means that the first and the second positive electrodes form a common electrode.

Such structure eliminates the need for the first positive electrode 20 and the intermediate layer 2, thereby making the battery device 1 smaller and thinner, while simplifying a manufacturing process. The manufacturing cost, therefore, is also reduced.

Forming the current collector layer 420 with a conductive material having a light reflectivity provides the current collector layer 420 with functionality as a light reflecting layer. The reflecting layer reflects the light that has passed through the solar cell 10 back to the photoelectric conversion layer 40, so that the photoelectric conversion layer 40 again receives an incident light, thereby improving the efficiency in electric generation of the solar cell 10.

Examples of the conductive material with a light reflectivity include: Al, Ni, Co, Ag, and alloys containing them.

Electronic apparatuses according to the embodiments of the invention will now be described with reference to FIGS. 3 and 4.

Figure 3:
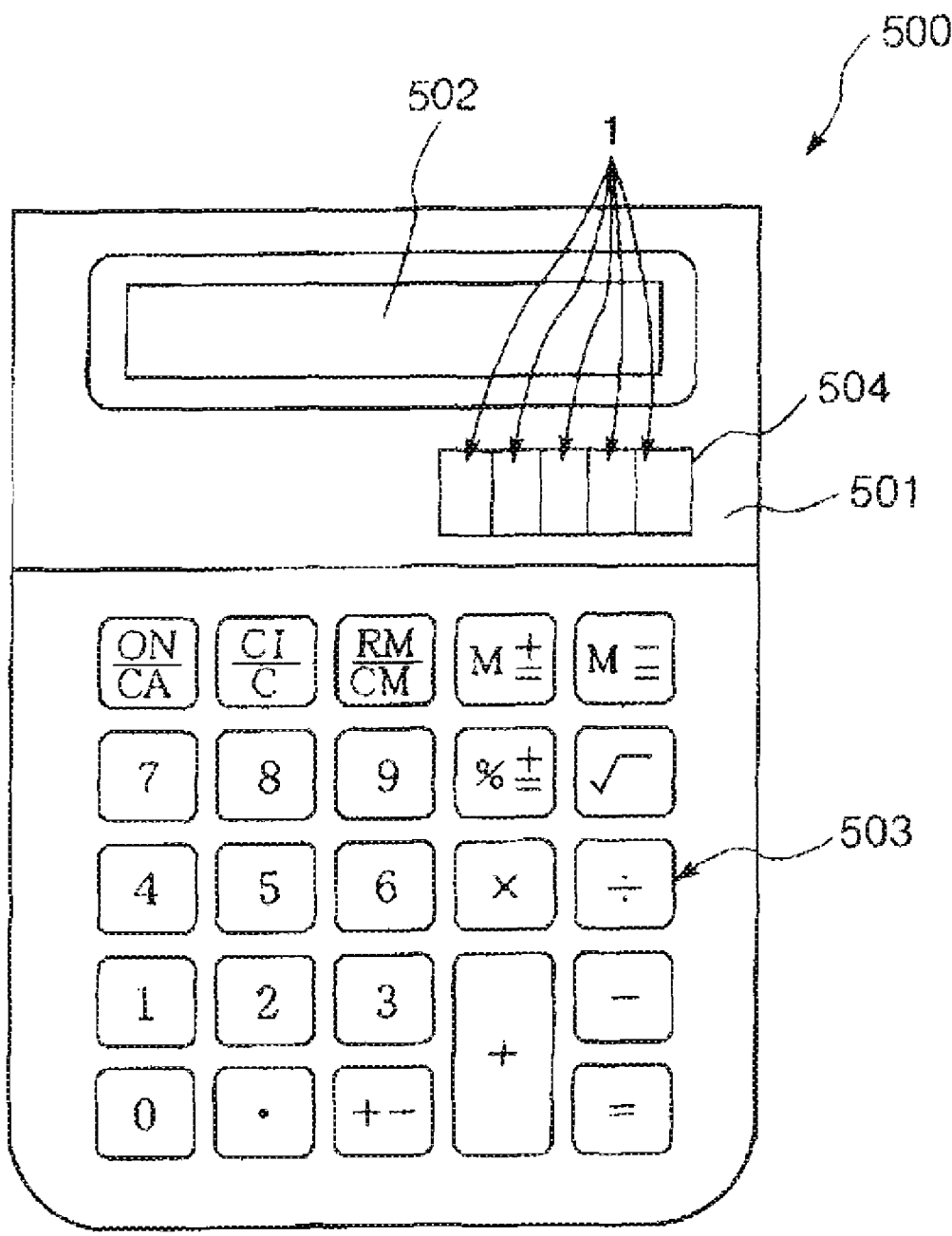
FIG. 3 is a top view illustrating a calculator to which an electronic apparatus according to one aspect of the invention is applied.

FIG. 3 is a top view illustrating a calculator in which an electronic apparatus according to the embodiments of the invention is applied. FIG. 4 is a perspective view illustrating a mobile phone (including personal handyphone system) in which an electronic apparatus according to the embodiments of the invention is applied.

A calculator 500 shown in FIG. 3 includes a body 501, a display 502 installed on the top surface (front surface) of the body 501, a plurality of operation buttons 503, and a battery device installing area 504.

In a configuration shown in FIG. 3, five battery devices 1 are connected and disposed to the battery device installing area 504.

Figure 4:
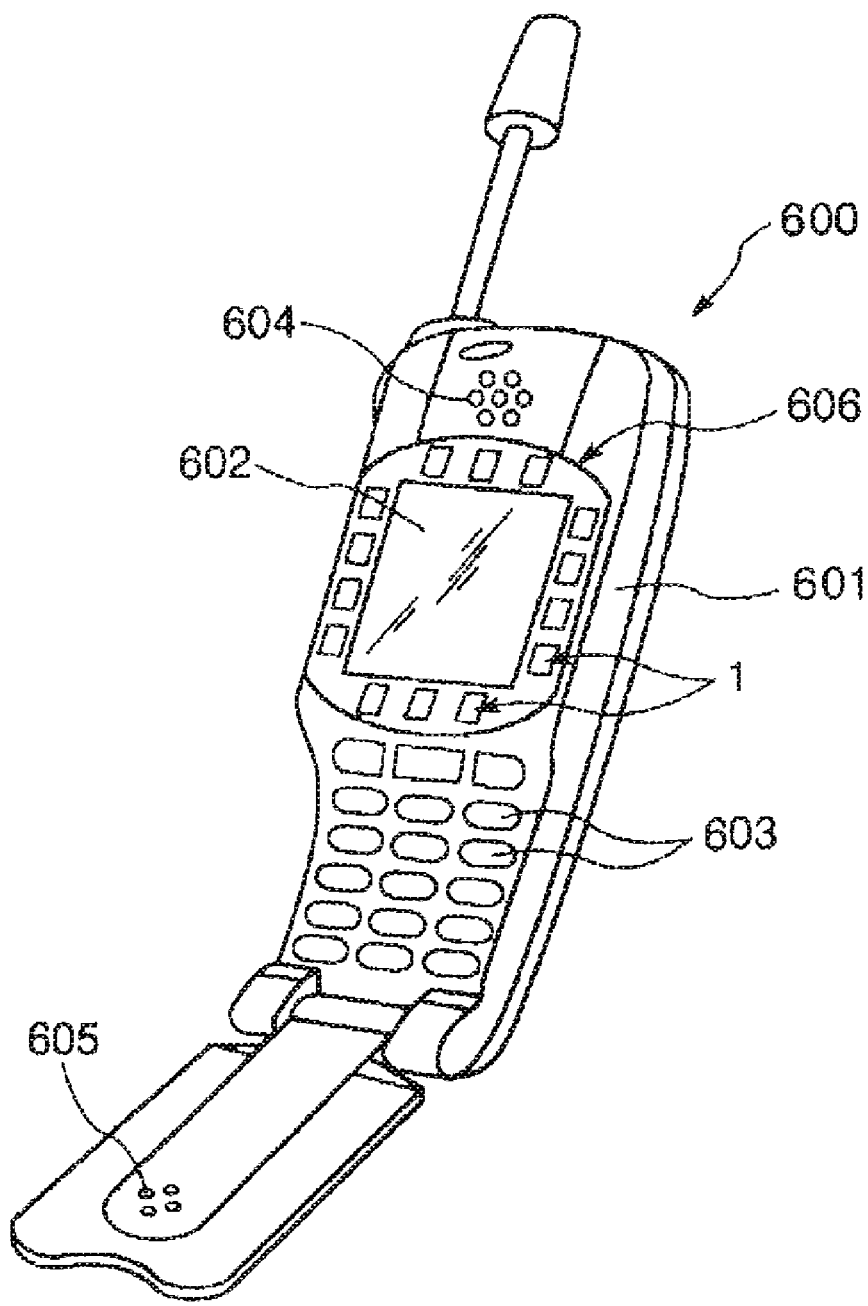
FIG. 4 is a perspective view illustrating a mobile phone (including personal handyphone system) to which an electronic apparatus according to one aspect of the invention is applied.

A mobile phone 600 shown in FIG. 4 includes a body 601, a display 602 installed on the front surface of the body 601, a plurality of operation buttons 603, an earpiece 604, a mouthpiece 605, and a battery device installing area 606.

In a configuration shown in FIG. 4, a plurality of battery devices 1 is connected and disposed in the battery device installing area 606, so as to surround the display 602.

As described, the battery device according to the illustrated embodiments of the invention is explained. However, the invention is not limited thereto. A structure of each part can be substituted with any structure that exhibits the similar functionality. Other structures may also be added.

According to the aspects of the invention, examples of the above include cases where: the intermediate layer is omitted according to the characteristics of the photoelectric conversion device; the positive or negative electrode is directly adhered to the other positive or negative electrode; and the positive or negative electrode of the photoelectric conversion device as well as of the secondary battery together form the common electrode. The battery device 1 is thereby made smaller and thinner.

Moreover, according to the embodiments of the invention, a barrier layer may also be provided between the photoelectric conversion layer and the first negative electrode, so as to prevent a direct contact (short) between the first negative electrode and the electrolyte layer.

In the above embodiments, the description is typically made for the case where all the layers of the battery device are formed with the liquid-phase process. However, one layer, or, two or more layers included in the battery device may be formed with the liquid-phase process. Examples of the vapor-phase process include vapor deposition and sputtering

EXAMPLES

Specific examples related to the embodiments of the invention will now be described.

1. Manufacturing Battery Device

First Example (1) Ni film (Ni thin plate) with an average thickness of 50 μm was prepared.

The Ni film was then dipped into a cleaning fluid for cleaning, and the surface thereof was cleaned up.

(2) A resistor layer was formed on one side of the Ni film, and a first positive electrode (catalytic layer) was formed thereon.

The resistor layer was formed with an electroless plating, depositing ZnO on the Ni film.

The resistor layer obtained had a resistance of 100Ω/□, with an average thickness of 10 μm. Consequently, an intermediate layer composed with the Ni film and the resistor layer was obtained.

The first positive electrode was formed by supplying a material for forming the first positive electrode on the resistor layer by spin coating, and thereafter drying the material at 60° C. for 60 minutes.

The material for forming the first positive electrode was prepared by an ultrasonic dispersion of 20 mg of Single Wall Carbon Nanotube (manufactured by Carbon Nanotechnologies, Inc.) into 50 mL, of deionized water.

The first positive electrode obtained had an average thickness of 0.1 μm.

(3) A second positive electrode was formed on the other side of the Ni film, using a material for forming an electrode layer.

The material for forming an electrode layer was prepared by dispersing 100 mg of δ-$Ag_{0.7}V_2O_5$ grains (electrode active substance) with an average grain size of 3 μm, into 150 g of deionized water, thereafter adding polyethylene glycol, setting the viscosity thereof to 20 cP.

The average thickness of the electrode layer obtained was 15 μm.

(4) An electrolyte layer was formed on the second positive electrode.

The electrolyte layer was formed by supplying a material for forming an electrolyte layer on the second positive electrode by spin coating, and thereafter drying the layer.

The material for forming an electrolyte layer was prepared by dispersing 100 mg of δ-$Ag_6I_4WO_4$, grains (solid electrolyte material) with an average grain size of 3 μm into 150 g of deionized water, thereafter adding polyethylene glycol, setting the viscosity thereof to 20 cP.

The average thickness of the electrolyte layer obtained was 15 μm.

(5) A second negative electrode was then formed on the electrolyte layer, in a manner similar to the step (3).

The average thickness of the second negative electrode obtained was 15 μm.

(6) A current collector layer was formed on the second negative electrode.

The current collector layer was formed by preparing a copper film (copper sheet) with an average thickness of 50 μm, thereafter depositing and adhering the copper film on the electrode layer with a press machine with a pressure of 4 ton/$cm^2$.

The steps described above produced a secondary battery which includes the first positive electrode and the intermediate layer, with the total thickness of 150 μm on average.

(7) An ITO film (a first negative electrode) with an average thickness of 0.5 μm was prepared.

This ITO film was then dipped into a cleaning fluid for cleaning, and the surface thereof was cleaned up.

(8) An inorganic semiconductor layer was formed on one side of the ITO film, and a pigment was deposited on the inorganic semiconductor layer, so as to form a photoelectric conversion layer.

The inorganic semiconductor layer was formed by supplying a material for forming an inorganic semiconductor layer on the ITO film by spin coating, and thereafter firing the layer in the atmosphere at 500° C. for one hour.

The material for forming an inorganic semiconductor layer was prepared by putting, into a polyethylene container (800 $cm^3$), 50 g of titanium dioxide powder (manufactured by Showa Denko K.K.) with an average grain size of 40 nm which was synthesized with vapor-phase method, 150 g of deionized water, and 500 g of 3φ zirconia ball, and thereafter dispersing the powder for 12 hours in a rotation speed of 80 ppm with a ball mill (manufactured by Kabushikigaisha Asahi Rika Seisakujo), thereby successfully producing titania paste in which the pigment was adsorbed. Polyethylene glycol was added thereto in order to adjust the viscosity to approximately 20 cP.

The average thickness of the inorganic semiconductor layer obtained was 10 μm.

A pigment was then deposited (adhered) to the inorganic semiconductor layer by supplying a pigment fluid on the inorganic semiconductor layer with an inkjet method.

The pigment fluid was prepared by dispersing 0.065 mg of N3 pigment into 80 g of saturated ethanol, thereafter adding polyethylene glycol, in order to set the viscosity thereof to 1 cP.

The pigment was deposited to 500% of the planer dimension of the inorganic semiconductor layer. The pigment content per unit volume (1 $cm^3$) of the inorganic semiconductor layer in the pigment-deposited region was $1.66*10^{-3}$ mmol/$cm^3$.

(9) A bank was formed along the peripheries of the photoelectric conversion layer and of the second positive electrode included in the secondary battery in a state where the two are facing each other.

First, a material for forming a bank ("SX1170-60" manufactured by Solaronix SA) was supplied along the periphery of the second positive electrode. The ITO film including the photoelectric conversion layer formed thereon was then laminated in order for the photoelectric conversion layer to contact the material for forming a bank. This laminate was disposed on a hot plate and was heated at 70° C. for one hour, and the material for forming a bank was hardened, thereby forming the bank that is provided with an inlet.

The distance between the photoelectric conversion layer and the second positive electrode was 60 μm.

(10) An electrolyte solution ("Iodolyte AN-50" manufactured by Solaronix SA) was infused as the material for forming an electrolyte layer, into the interior space of the bank, and thereafter the inlet was sealed. The steps described above produced the battery device provided with the secondary battery and the solar cell, the positive electrodes thereof being adhered together, including the intermediate layer therebetween.

The output voltage of the solar cell obtained was 0.54, and the withstand voltage of the secondary battery was 0.53V.

(11) Finally, an external circuit was connected to this battery device.

Second Example

The battery device was produced in a manner similar to that of the first example, except for depositing the pigments to 60% of the planer dimension of the inorganic semiconductor layer.

Third Example

The battery device was produced in a manner similar to that of the first example, except for depositing the pigments to 70% of the planer dimension of the inorganic semiconductor layer.

2. Evaluation

The battery devices obtained in the above examples were charged with a solar simulator with an irradiance of 100 mW/$cm^2$, and thereafter were discharged.

Figure 5:
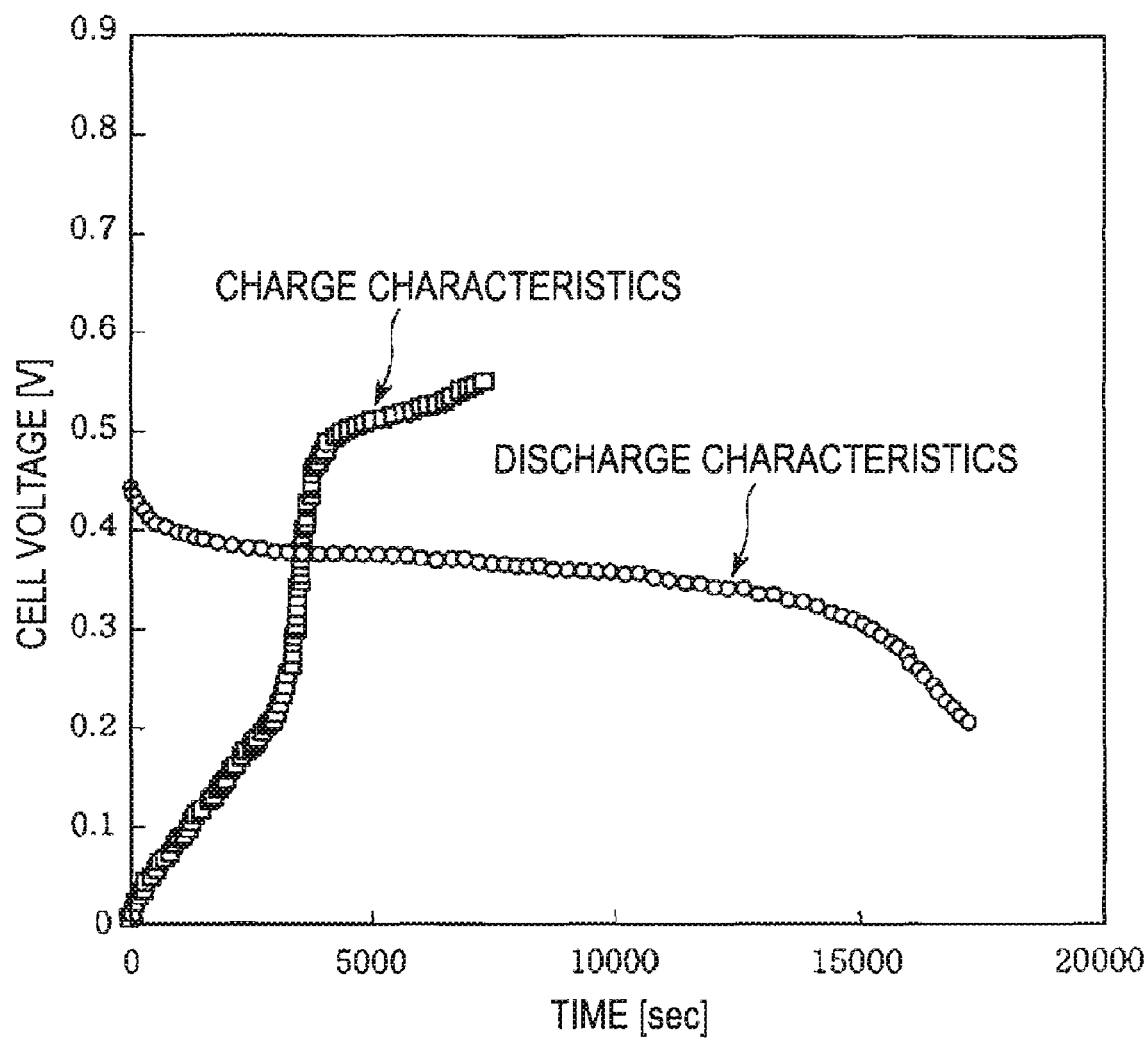
FIG. 5 is a graph showing the charge-discharge characteristics of a battery device according to one example, the battery device discharging at a current density of 250 μA/cm².

A graph in FIG. 5 illustrates the charge-discharge characteristics of the battery device according to the first example, when discharged at a current density of 250 μA/cm².

Figure 6:
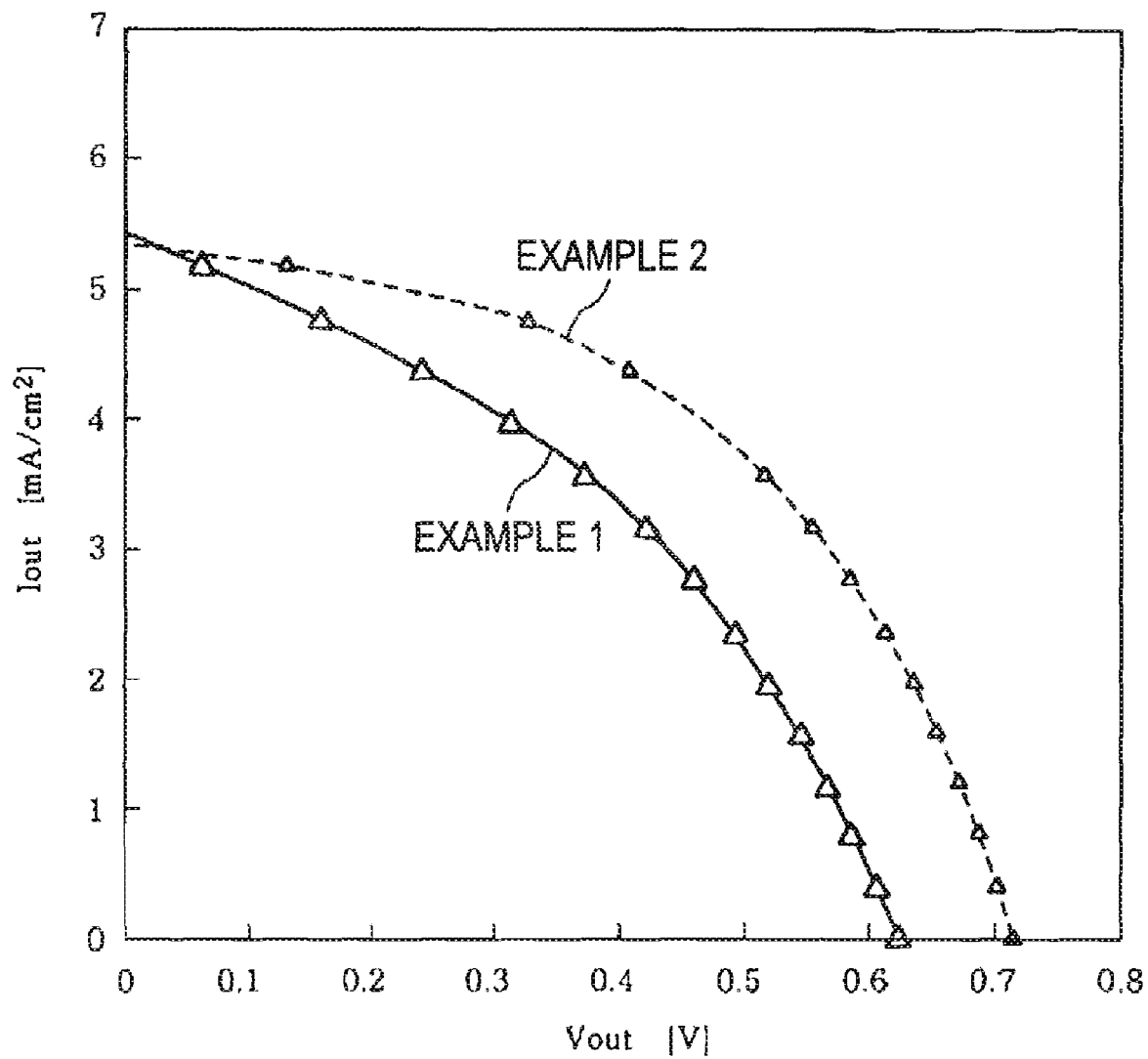
FIG. 6 is a graph showing the relation between a current and a voltage during the discharge in each example.

Moreover, a graph in FIG. 6 illustrates the relation between a current and a voltage during the discharge in each example.

The battery device according to the first example exhibited the discharge capacity of 0.6 mAh/cm² when the final voltage was 0.3V. This number was larger by one digit compared to 0.051 mAh, cm² disclosed in "Tejima et al, Abstracts of the 2005 Fall Meeting of the Electrochemical Society of Japan".

Moreover, the discharge characteristics of the battery device in the first example exhibits the existence of the region where the discharge voltage was approximately constant, making the designing thereof easier, while the case disclosed in the above document, such region did not exist.

Moreover, as shown in FIG. 6, it was confirmed that the output voltage of the solar cell could be adjusted, by setting the size of the region for depositing the pigment on the inorganic semiconductor layer.

The entire disclosure of Japanese Patent Application Nos: JP-A-8-330616, Filed Jun. 1, 1995; Abstracts of the 2005 Fall Meeting of the Electrochemical Society of Japan 1E20, Page 93 are expressly incorporated by reference herein.

What is claimed is:

1. A battery device, comprising:
a photoelectric conversion device, including:
a first positive electrode;
a first negative electrode; and
a photoelectric conversion layer provided between the first positive electrode and the first negative electrode, the photoelectric conversion layer including an inorganic semiconductor and a pigment; and
a secondary battery, including:
a second positive electrode;
a second negative electrode; and
an electrolyte layer provided between the second positive electrode and the second negative electrode;
one of a first electrode pair and a second electrode pair being adhered to an intermediate layer, the first electrode pair including the first and the second positive electrodes, and the second electrode pair including the first and the second negative electrodes, one of the first electrode pair and the second electrode pair being electrically connected via the intermediate layer.

2. The battery device according to claim 1, wherein an output voltage of the photoelectric conversion device and a withstand voltage of the secondary battery are approximately the same.

3. The battery device according to claim 1, wherein an average thickness thereof is 100 to 700 μm.

4. The battery device according to claim 1, wherein an output voltage of the photoelectric conversion device is 0.55V or less.

5. The battery device according to claim 1, wherein the output voltage of the photoelectric conversion device is adjusted in accordance with at least one of a presence and a size of a region in which the pigment is not applied on the inorganic semiconductor layer when viewed from the top.

6. The battery device according to claim 1, wherein at least one of the second positive electrode and the second negative electrode of the secondary battery is composed with an electrode material containing silver vanadate.

7. The battery device according to claim 1, wherein the electrolyte layer of the secondary battery is composed with an electrolyte material containing silver iodide tungstate.

8. The battery device according to claim 1, wherein the second positive electrode is formed with a laminate, one layer therewithin having a current collector layer at a side farther from the electrolyte layer.

9. The battery device according to claim 1, wherein the second negative electrode is formed with a laminate, one layer therewithin having a current collector layer at a side farther from the electrolyte layer.

10. An electronic apparatus comprising the battery device according to claim 1.

11. A battery device, comprising:
a photoelectric conversion device, including:
a first positive electrode;
a first negative electrode; and
a photoelectric conversion layer provided between the first positive electrode and the first negative electrode, the photoelectric conversion layer including an inorganic semiconductor and a pigment; and
a secondary battery, including:
a second positive electrode;
a second negative electrode; and
an electrolyte layer provided between the second positive electrode and the second negative electrode;
one of a first electrode pair and a second electrode pair being adhered having a conductive intermediate layer therebetween, the first electrode pair including the first and the second positive electrodes, and the second electrode pair including the first and the second negative electrodes.

12. The battery device according to claim 11, wherein the intermediate layer is a laminate including a plurality of deposited layers.

13. The battery device according to claim 11, wherein the intermediate layer includes a resistor layer having a functionality to adjust the amount of electricity generated by the photoelectric conversion device in order for the electricity to be supplied to the secondary battery.

14. The battery device according to claim 11, wherein the intermediate layer includes a light reflecting layer having a functionality to reflect a light passing through the photoelectric conversion device back to the photoelectric conversion layer.

15. An electronic apparatus comprising the battery device according to claim 11.

16. A battery device, comprising:
a photoelectric conversion device, including:
a first positive electrode;
a first negative electrode; and
a photoelectric conversion layer provided between the first positive electrode and the first negative electrode, the photoelectric conversion layer including an inorganic semiconductor and a pigment; and
a secondary battery, including:
a second positive electrode;
a second negative electrode; and
an electrolyte layer provided between the second positive electrode and the second negative electrode;
one of a first electrode pair and a second electrode pair forming a common electrode, the first electrode pair including the first and the second positive electrodes, and the second electrode pair including the first and the second negative electrodes.

17. The battery device according to claim 16, wherein the common electrode has a functionality of a light reflecting layer.

* * * * *